(12) United States Patent
Satoh et al.

(10) Patent No.: US 7,580,027 B2
(45) Date of Patent: Aug. 25, 2009

(54) METHOD AND APPARATUS FOR PROCESSING INFORMATION

(75) Inventors: Kiyohide Satoh, Kawasaki (JP); Daisuke Kotake, Yokohama (JP); Shinichi Aratani, Yokohama (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 750 days.

(21) Appl. No.: 11/265,981

(22) Filed: Nov. 3, 2005

(65) Prior Publication Data

US 2006/0094955 A1 May 4, 2006

(30) Foreign Application Priority Data

Nov. 4, 2004 (JP) .............................. 2004-320638
Jul. 27, 2005 (JP) .............................. 2005-217554

(51) Int. Cl.
*G09G 5/00* (2006.01)
*A61B 5/05* (2006.01)
(52) U.S. Cl. ..................... 345/156; 600/414; 600/426
(58) Field of Classification Search ................ 382/156, 382/100, 168, 235, 307; 345/156, 629, 633; 600/414, 425, 426; 702/56, 150, 151, 152, 702/153, 95, 104; 348/14.07, 290, 423.1
See application file for complete search history.

(56) References Cited

U.S. PATENT DOCUMENTS 5,737,641 A * 4/1998 Kobayashi ................... 396/51
6,317,266 B1 * 11/2001 Yoshimura et al. ........... 359/619
6,697,761 B2 * 2/2004 Akatsuka et al. ............. 702/151
7,430,489 B2 * 9/2008 Fager et al. .................. 702/152

OTHER PUBLICATIONS

Lowe, "Fitting Parameterized Three-Dimensional Models to Images", IEEE Transactions on Pattern Analysis and Machine Intelligence, vol. 13, No. 5, May 1991, pp. 441-450.
Comport, et al., "A real-time tracker for markerless augmented reality", IRISA—INRIA Rennes, Campus de Beaulieu, 35042 Rennes, France, 2004.
Satoh, et al., "A head Tracking Method Using Bird's-Eye View Camera and Gyroscope", Proc. ISMAR'04, pp. 202-211.

* cited by examiner

*Primary Examiner*—Abolfazl Tabatabai
(74) *Attorney, Agent, or Firm*—Canon U.S.A. Inc., I.P. Division (57) ABSTRACT

An objective viewpoint image of an object captured at an objective viewpoint position is obtained, a measurement value of a sensor is received, information about the image coordinates of calibrating indices is detected from an objective viewpoint image, and two kinds of arrangement information of the calibrating indices and the sensor both placed on and relative to the object are obtained on the basis of the measurement value and the information about the image coordinates of the calibrating indices. With this, the two kinds of arrangement information are easily and accurately obtained at the same time.

7 Claims, 5 Drawing Sheets

METHOD AND APPARATUS FOR PROCESSING INFORMATION

BACKGROUND OF THE INVENTION

1. Field of the Invention

The present invention relates to a method and an apparatus for obtaining arrangement information of indices and a sensor both placed on and relative to an object.

2. Description of the Related Art

By setting a plurality of indices on a measuring object; capturing the measuring object with a camera; and detecting the image coordinates of the projected figure of each index in the captured image, the position and the orientation of the measuring object relative to the camera or in the space having the camera installed therein are obtained (see, e.g., D. G. Lowe, "Fitting Parameterized three-dimensional models to images", IEEE Transactions on PAMI, vol. 13, no. 5, pp. 441-450, 1991 (hereinafter "Lowe"), and A. I. Comport, E. Marchard, F. Chaumette: "A real-time tracker for markerless augmented reality", Proc. Int'l Symp. On Mixed and Augmented Reality 2004, pp. 36-45, 2004 (hereinafter "Comport et al.").

In K. Satoh, S. Uchiyama, and H. Yamamoto: "A head tracking method using bird's-eye view camera and gyroscope", Proc. 3rd IEEE/ACM Int'l Symp. on Mixed and Augmented Reality (ISMAR 2004), PP. 202-211, 2004 (hereinafter "Satoh et al."), a method for measuring the position and the orientation of an object is proposed. In this method, indices and an orientation sensor are placed on a measuring object, and an objective-viewpoint camera is placed to observe the measuring object at an objective (third-person) viewpoint. The position and the orientation of the object are measured on the basis of figures of the indices detected from an image captured by the objective-viewpoint camera, and an orientation-measurement value of an orientation sensor. As for the case where an imaging device is a measuring object, a method has been proposed for measuring the position and the orientation of an object (by a group including the inventors of the present invention and others). In this method, indices and an orientation sensor are placed on an imaging device, an objective-viewpoint camera is placed to observe the imaging device, and other indices are arranged in a scene to be observed by the imaging device. The position and the orientation of the imaging device are measured on the basis of figures of the indices on the imaging device detected from an image captured by the objective-viewpoint camera; figures of the indices in a scene detected from an image captured by the imaging device itself; and an orientation-measurement value of an orientation sensor.

Regarding the method in which the position and the orientation of a measuring object are computed by detecting figures of a plurality of indices set on the object, the positional relationship between the indices and the object must be previously known. In the case where an orientation sensor is used for measuring the position and the orientation of an object as set forth in Satoh et al., the orientation of the orientation sensor relative to the measuring object must be previously known.

Hitherto, works for obtaining these positional relationships, i.e., two kinds of arrangement information of the indices and the sensor relative to the object, are independently conducted (hereinafter, a work generally referred to as calibration). That is, two kinds of calibration of an index and an orientation sensor are conducted in mutually different steps. Unfortunately, mutually independent calibration of them causes troublesome works.

SUMMARY OF THE INVENTION

In view of the above problems, the present invention is directed to easily and accurately obtain two kinds of arrangement information of calibrating indices and a sensor both placed on and relative to an object at the same time.

According to one aspect of the present invention, an information processing method for obtaining two kinds of arrangement information of calibrating indices and a sensor both placed on and relative to an object so as to serve as calibration information includes steps of obtaining a captured image of the object; receiving a measurement value of the sensor; detecting information about the image coordinates of the respective calibrating indices, from the image; and obtaining calibration information based on the measurement value and the information about the image coordinates of the respective calibrating indices.

According to another aspect of the present invention, an information processing method for computing the positions of respective calibrating indices and the orientation of an orientation sensor both placed on and relative to an imaging device so as to serve as calibration information includes steps of obtaining a first captured image by the other imaging section; obtaining a second image captured by the imaging device; receiving a measurement value of the orientation sensor; detecting information about the image coordinates of the respective calibrating indices, from the first image; detecting information about the image coordinates of respective reference indices arranged in a scene, from the second image; and computing calibration information based on the measurement value and the information about the image coordinates of the respective calibrating indices and the respective reference indices.

Other features and aspects of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will now be described in detail in accordance with the accompanying drawings.

First Embodiment

A calibration apparatus according to a first embodiment obtains two kinds of arrangement information of indices and an orientation sensor both placed on and relative to an imaging device. The calibration apparatus and a calibration method according to the present embodiment will be described below.

Figure 1:
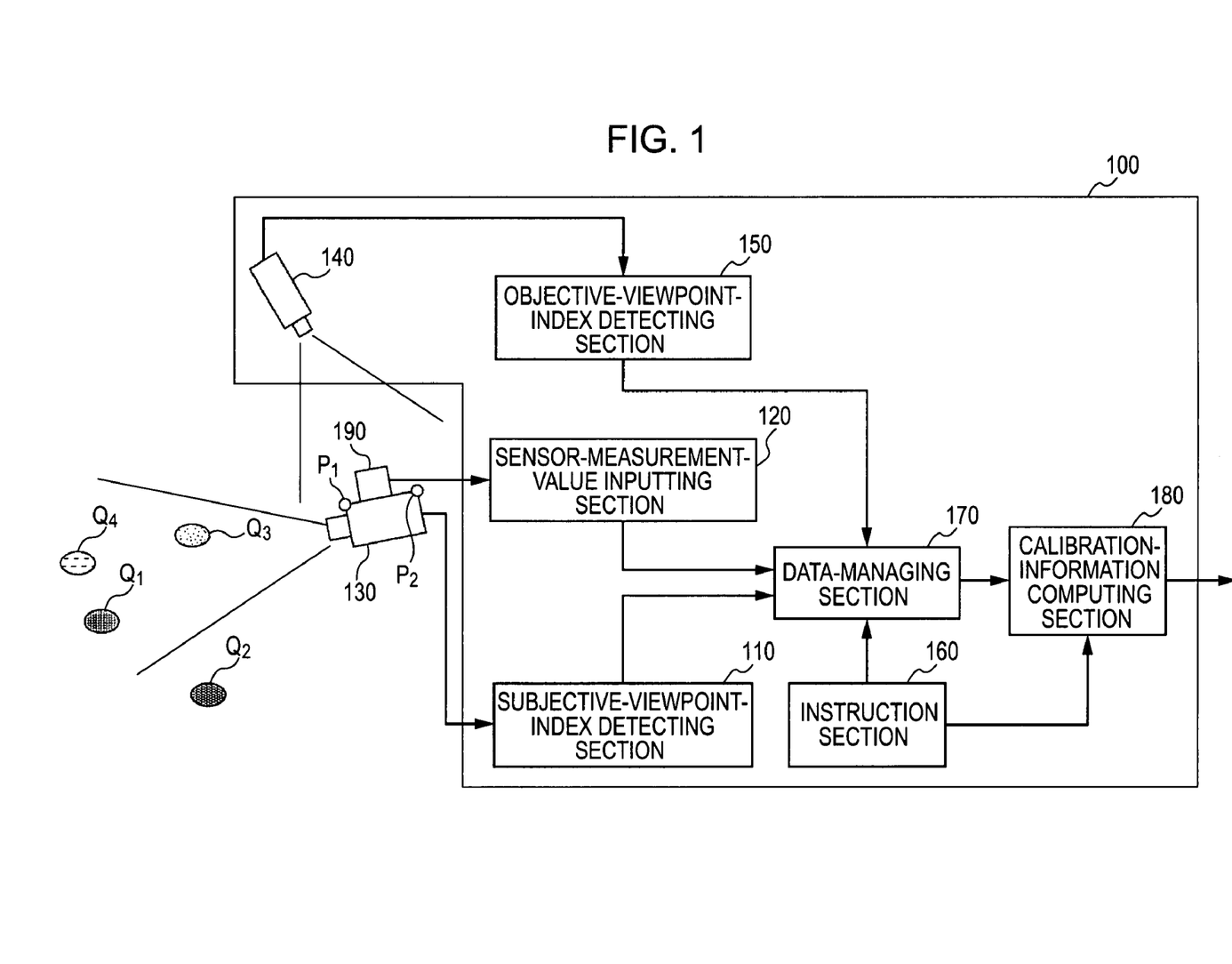
FIG. 1 shows an exemplary structure of a calibration apparatus according to a first embodiment of the present invention.

FIG. 1 shows an exemplary structure of a calibration apparatus 100 according to the present embodiment. As shown in FIG. 1, the calibration apparatus 100 according to the present embodiment includes a subjective-viewpoint-index detecting section 110, a sensor-measurement-value inputting section 120, an objective-viewpoint camera 140, an objective-viewpoint-index detecting section 150, an instruction section 160, a data-managing section 170, and a calibration-information computing section 180 and is connected to a calibrating imaging-device 130 and an orientation sensor 190, which will be described later.

It is presumed that the imaging device 130 has the calibrating orientation sensor 190 placed thereon and two calibrating indices $P_1$ and $P_2$ set thereon (hereinafter, called objective viewpoint indices). While the orientation of the orientation sensor 190 and the positions of the respective objective viewpoint indices are unknown in the subjective-viewpoint-camera coordinate system (the coordinate system of the imaging device 130, in which one point on the imaging device 130 is defined as an origin and three axes orthogonal to one another are defined as the X-, Y-, and Z-axes), the unknown orientation of the orientation sensor and positions of the respective objective viewpoint indices in the subjective-viewpoint-camera coordinate system serve as information to be calibrated by the calibration apparatus 100, that is, an output of the calibration apparatus 100 according to the present embodiment.

According to the present embodiment, since the imaging device 130 serving as a measuring object has the indices arranged thereon and the orientation sensor 190 placed thereon, calibration information is configured by two kinds of arrangement information of the indices and the orientation sensor.

A plurality of indices $Q_k$ (k=1 ... $K_n$) serving as indices to be captured by the imaging device 130 (hereinafter, an index is referred to as a subjective viewpoint index (a reference index)) is arranged at a plurality of positions in the physical space, wherein the positions of the indices in the world coordinate system (the coordinate system in which one point in the physical space is defined as an origin and three axes orthogonal to one another are respectively defined as the X-, the Y-, and the Z-axes) are known. The subjective viewpoint indices $Q_k$ should be arranged such that at least three of them can be observed by the imaging device 130 upon obtaining calibrating data. In an example situation shown in FIG. 1, the four subjective viewpoint indices $Q_1$, $Q_2$, $Q_3$ and $Q_4$ are arranged, and three of them (i.e., $Q_1$, $Q_3$, and $Q_4$) are present in the field of view of the imaging device.

The subjective viewpoint indices $Q_k$ may be configured by, for example, circular markers having respectively different colors or feature points such as natural features having respectively different texture features. Alternatively, quadrangular indices, each formed by a quadrangular region having a certain area, may be used as the indices. The indices may be of any type as long as the image coordinates of a projected figure on a captured image can be detected and the indices can be individually identified.

The subjective-viewpoint-index detecting section 110 receives an image output by and from the imaging device 130 (hereinafter, this image is referred to as a subjective viewpoint image) and detects the image coordinates of the subjective viewpoint indices $Q_k$ in the received captured image. For example, when the subjective viewpoint indices $Q_k$ are configured by markers having respectively different colors, regions corresponding to the respective colors of the markers are detected from the subjective viewpoint image, and the positions of the center of gravity of the regions are set as the detecting coordinates of the indices. When the subjective viewpoint indices $Q_k$ are configured by feature points having respectively different texture features, the positions of the indices are detected by applying template-matching on the subjective viewpoint image with the aid of template images of the respective indices previously stored as known information. When the quadrangular indices are used as reference indices, the captured image is binaries, labeling is then performed, and index candidates formed by four straight lines are detected among labeled regions having at least a predetermined area. In addition, determination whether a particular pattern is present in the candidate region allows fault detection to be eliminated. Furthermore, the direction and the identifier of the index are also obtained by the pattern inside the region. Finally, image coordinates of four vertices of the square are detected. Herein, the quadrangular indices detected as described above are considered as four indices formed by four apexes.

The subjective-viewpoint-index detecting section 110 outputs image coordinates $u^{Qkn}$ and identifiers $k_n$ of the corresponding detected subjective viewpoint indices $Q_{kn}$ to the data-managing section 170 in response to its request, wherein n (=1 ... N) stands for an index of the corresponding detected index, and N stands for the total number of the detected indices. For example, in the case shown in FIG. 1, while N=3, the identifiers: $k_1$=1, $k_2$=3, and $k_3$=4, and the image coordinates: $u^{Qk1}$, $u^{Qk2}$, and $u^{Qk3}$ respectively corresponding to these identifiers are output. While the subjective-viewpoint-index detecting section 110 according to the present embodiment sequentially executes the above-described index-detecting process upon receipt of an image from the imaging device 130 as a trigger, the detecting section 110 may execute the process on the basis of a request of the data-managing section 170 (on the basis of a subjective viewpoint image received at that time).

The sensor-measurement-value inputting section 120 receives an orientation-measurement value from the orientation sensor 190 and outputs it to the data-managing section 170 in response to its request. While a value output by the orientation sensor 190 generally indicates the orientation of the sensor in the sensor coordinate system uniquely defined by the sensor, the sensor-measurement-value inputting section 120 transforms it into the orientation of the sensor in the world coordinate system by multiplying its known transformation matrix from the sensor coordinate system to the world coordinate system and outputs the transformed rotation matrix (hereinafter, written by $R_{ws}$) to the data-managing section 170.

The objective-viewpoint camera 140 is arranged at a fixed (static) position such that the imaging device 130 is capturable. It is presumed that the position and the orientation of the objective-viewpoint camera 140 in the world coordinate system are previously stored in the calibration-information computing section 180 as known values.

The objective-viewpoint-index detecting section 150 receives an image captured by the objective-viewpoint camera 140 (hereinafter, the image is called as an objective viewpoint image); detects the image coordinates of the corresponding objective viewpoint indices in the captured image in a similar way as done by the subjective-viewpoint-index detecting section 110 (in accordance with kinds of objective viewpoint indices $P_1$ and $P_2$ to be calibrated); and outputs detected image coordinates $u^{P1}$ and $u^{P2}$ to the data-managing section 170 in response to its request. While the objective-viewpoint-index detecting section 150 according to the present embodiment sequentially executes the above-described index-detecting process upon receipt of an objective viewpoint image as a trigger, the objective-viewpoint-index detecting section 150 may execute the process in response to request of the data-managing section 170 (on the basis of an objective viewpoint image received at that time).

The instruction section 160 transmits an instruction of obtaining data to the data-managing section 170 upon receipt of a data-obtaining command input by an operator (not shown). The instruction section 160 also transmits another instruction of computing calibration information to the calibration-information computing section 180 upon receipt of a calibration-information-computing command input by the operator. A command can be input to the instruction section 160, for example, with the aid of a keyboard and pressing a key of the keyboard having a particular command allocated thereto, or by the aid of a graphic user interface (GUI) displayed on a monitor.

Upon receipt of the instruction of obtaining data from the instruction section 160, the data-managing section 170 receives (i) the image coordinates and the identifier of each of the subjective viewpoint indices from the subjective-viewpoint-index detecting section 110, (ii) a sensor-measurement value $R_{ws}$ from the sensor-measurement-value inputting section 120, and (iii) the image coordinates $u^{P1}$ and $u^{P2}$ of the objective viewpoint indices from the objective-viewpoint-index detecting section 150. Then, the data-managing section 170 creates a plurality of data sets, the number of which is that of the received subjective viewpoint indices, wherein each data set is configured by (a) detection information (the identifier and the image coordinates) of a subjective viewpoint index at a certain time, (b) the image coordinates of all objective viewpoint indices detected at the same time, and (c) a sensor-measurement value at the same time. Then, the data set is added to a data list for storage. Also, the data-managing section 170 outputs the stored data list to the calibration-information computing section 180 in response to its request.

Upon receipt of an instruction of computing calibration information from the instruction section 160, the calibration-information computing section 180 receives the data list from the data-managing section 170, performs a calibration process on the basis of the data list, and outputs resultantly obtained calibration information (i.e., the positions of each of the objective viewpoint indices in the subjective-viewpoint-camera coordinate system and the orientation of the orientation sensor 190 in the subjective-viewpoint-camera coordinate system.

Figure 2:
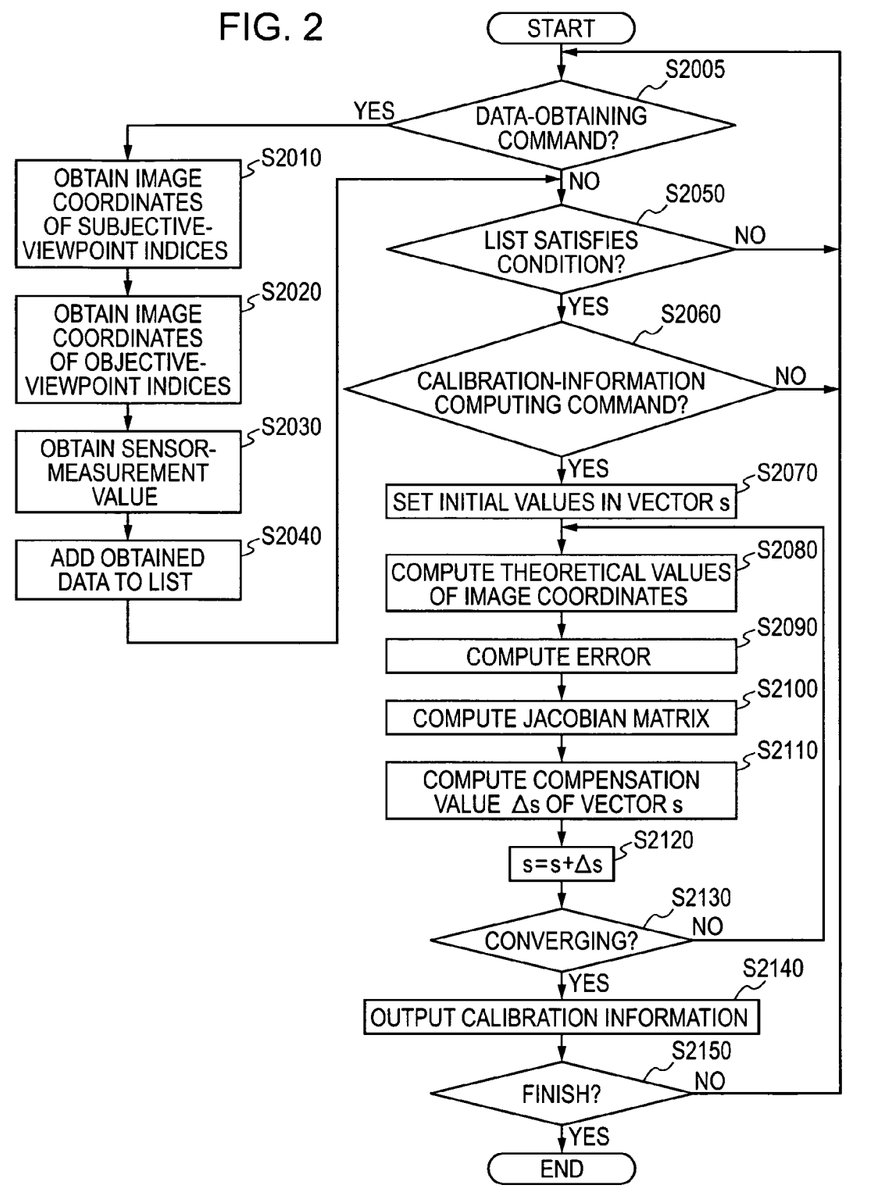
FIG. 2 is a flowchart of an exemplary process of a calibration method according to the first embodiment.

FIG. 2 is a flowchart of a calibration process of the calibration apparatus according to the present embodiment performed for obtaining calibration information. Program code in accordance with the flowchart is stored in memories (not shown) such as a random access memory (RAM) and/or a read-only memory (ROM) in the calibration apparatus and read and executed by a central processing unit (CPU) (not shown).

In step S2005, the instruction section 160 determines whether a data-obtaining command is input by the operator. The operator arranges the imaging device 130 at a position for obtaining data and inputs the data-obtaining command. If a data-obtaining command is not input by the operator, processing proceeds to step S2050. Otherwise, if receiving the data-obtaining command, the instruction section 160 allows the process to move to step S2010.

In step S2010, the data-managing section 170 receives the image coordinates $u^{Qkn}$ and their identifiers $k_n$ of the respective subjective viewpoint indices $Q_{kn}$ from the subjective-viewpoint-index detecting section 110 detecting the same.

In step S2020, the data-managing section 170 receives the image coordinates $u^{P1}$ and $u^{P2}$ of the objective viewpoint indices from the objective-viewpoint-index detecting section 150 detecting the same.

In step S2030, the data-managing section 170 receives the orientation-measurement value $R_{ws}$ from the sensor-measurement-value inputting section 120. With these steps S2010, S2020, and S2030, a sensor measurement value and the respective image coordinates of the objective viewpoint indices and the subjective viewpoint indices at the same time can be obtained.

In step S2040, the data-managing section 170 adds respective information of the received subjective viewpoint indices $Q_{kn}$ to a data list L so as to serve as data $D_i$. To be more specific, the identifier $k_n$ received from the subjective-viewpoint-index detecting section 110 is written by $k_i$; likewise, $u^{Qkn}$ input from the subjective-viewpoint-index detecting section 110 is written by $u^{Qki}$; the image coordinates $u^{P1}$ and $u^{P2}$ of the objective viewpoint indices received from the objective-viewpoint-index detecting section 150 are written by $u^{P1i}$ and $u^{P2i}$; the orientation-measurement value $R_{ws}$ input from the sensor-measurement-value inputting section 120 is written by $R_{wsi}$; and a set of $D_i=[k_i, u_i^{Qki}, u^{P1i}, u^{P2i}, R_{wsi}]$ is registered in the data list L as the i-th data, wherein i (=1 . . . I) stands for an index of the corresponding set of the registered data, and I stands for the total sets of the registered data. Data is obtained through the above-described step. Processing then proceeds to step S2050.

In step S2050, the data-managing section 170 determines whether the already obtained data list has sufficient information for computing calibration information. If the data list does not satisfy the condition, the process returns to step S2005 and the calibration apparatus waits for an input of a data-obtaining command. If the data list satisfies the condition for computing calibration information, the process moves to step S2060. An example condition of the data list of having information sufficient for computing calibration information is set such that data about three or more different subjective viewpoint indices $Q_k$ appears at least twice in the data list L. Meanwhile, since accuracy of the computed calibration information improves as the versatility of input data increases, the condition may be set so as to request a greater number of data.

In step S2060, the instruction section 160 determines whether calibration-information computing command is input by the operator. If the calibration-information computing command is input, the process moves to step S2070. If not, the process returns to step S2005, and the calibration apparatus waits for an input of a data-obtaining command.

The calibration-information computing section (hereinafter, sometimes simply referred to as computing section) 180 treats calibration information to be obtained as a nonary state vector s, that is, $s=[x_c^{P1}\ y_c^{P1}\ z_c^{P1}\ x_c^{P2}\ y_c^{P2}\ z_c^{P2}\ \xi_{cs}\ \phi_{cs}\ \zeta_{cs}]^T$ defined by the position: $x_c^{P1}=(x_c^{P1}, y_c^{P1}, z_c^{P1})$, of the objective viewpoint index $P_1$ in the subjective-viewpoint-camera coordinate system; the position: $x_c^{P2}=(x_c^{P2}, y_c^{P2}, z_c^{P2})$, of the objective viewpoint index $P_2$ in the subjective-viewpoint-camera coordinate system; and the orientation: $\omega_{cs}=(\xi_{cs}, \phi_{cs}, \zeta_{cs})$, of the orientation sensor 190 in the subjective-viewpoint-camera coordinate system. A variety of methods for expressing an orientation with a ternary value are provided, and it is presumed here that the orientation is expressed with a ternary vector defining a rotating angle and axis respectively with the magnitude and the orientation of the vector.

In step S2070, the computing section 180 provides appropriate initial values to the state vector s. For example, the initial values are previously provided through a setting operation by the operator, e.g., via a dialog.

In step S2080, the computing section 180 computes theoretical value: $u'^{Qki}_i = [u'^{Qki}_{xi}, u'^{Qki}_{yi}]$, of subjective-viewpoint image-coordinates of the subjective viewpoint index $Q_{ki}$ on the basis of the respective data $D_i$ in the data list L and the state vector s with respect to the corresponding i from 1 through I. Meanwhile, the theoretical value $u'^{Qki}_i$ indicates the coordinates of the subjective viewpoint index to be visible in the subjective viewpoint image for a certain state vector s. The theoretical value $u_i^{Qki}$ is computed with expression (1) on the basis of the state vector s.

$$u'^{Qki}_i = F_i(s) \quad (1)$$

To be more specific, a function $F_i(s)$ is configured by the following expressions (2) and (3). With expression (2), the position $x_{Ci}^{Qki}$ of the subjective viewpoint index $Q_{ki}$ in the subjective-viewpoint-camera coordinates upon obtaining the i-th data is computed on the basis of the state vector s and the data $D_i$, and with expression (3), the theoretical coordinates $u'^{Qki}_i$ on the subjective viewpoint image of the subjective viewpoint index $Q_{ki}$ are computed from $x_{Ci}^{Qki}$.

$$x_{C_i}^{Q_{k_i}} = \begin{bmatrix} x_{C_i}^{Q_{k_i}} & y_{C_i}^{Q_{k_i}} & z_{C_i}^{Q_{k_i}} \end{bmatrix}^T = R_{WC_i}^{-1} \cdot \left( x_W^{Q_{k_i}} - t_{WC_i} \right) \quad (2)$$

$$u_i'^{Q_{k_i}} = \begin{bmatrix} u'^{Q_{k_i}}_{xi} & u'^{Q_{k_i}}_{yi} \end{bmatrix}^T = \begin{bmatrix} -f_x^C \frac{x_{C_i}^{Q_{k_i}}}{z_{C_i}^{Q_{k_i}}} & -f_y^C \frac{y_{C_i}^{Q_{k_i}}}{z_{C_i}^{Q_{k_i}}} \end{bmatrix}^T \quad (3)$$

where $x_W^{Qki}$ is a position of the subjective viewpoint index $Q_{ki}$ in the world coordinate system; $f^c_x$ and $f^c_y$ are focal distances of the imaging device 130 respectively in the X- and Y-axes, and it is presumed that these are previously stored as known values.

In expression (2), $R_{wci}$ stands for the orientation of the imaging device 130 in the world coordinate system upon obtaining the i-th data and is defined by expression (4) with the aid of a matrix $R_{cs}$ decided by $\omega_{cs}$ serving as an element of the state vector s and the orientation-measurement value $R_{wsi}$ serving as an element of the data $D_i$.

$$R_{WC_i} = R_{WS_i} \cdot R_{CS}^{-1} \quad (4)$$

In expression (4), $R_{cs}$ stands for a rotation matrix used for coordinate transformation from the sensor coordinate system to the subjective-viewpoint-camera coordinate system and is defined by the following expressions:

$$R_{cs} = \begin{bmatrix} \frac{\xi^2}{\theta^2}(1-\cos\theta)+\cos\theta & \frac{\xi\psi}{\theta^2}(1-\cos\theta)-\frac{\zeta}{\theta}\sin\theta & \frac{\xi\zeta}{\theta^2}(1-\cos\theta)+\frac{\psi}{\theta}\sin\theta \\ \frac{\psi\xi}{\theta^2}(1-\cos\theta)+\frac{\zeta}{\theta}\sin\theta & \frac{\psi^2}{\theta^2}(1-\cos\theta)+\cos\theta & \frac{\psi\zeta}{\theta^2}(1-\cos\theta)-\frac{\xi}{\theta}\sin\theta \\ \frac{\zeta\xi}{\theta^2}(1-\cos\theta)-\frac{\psi}{\theta}\sin\theta & \frac{\zeta\psi}{\theta^2}(1-\cos\theta)+\frac{\xi}{\theta}\sin\theta & \frac{\zeta^2}{\theta^2}(1-\cos\theta)+\cos\theta \end{bmatrix} \quad (5)$$

$$\theta = \sqrt{\xi^2 + \psi^2 + \zeta^2} \quad (6)$$

In expression (2), $t_{wci}$ stands for the position of the imaging device 130 in the world coordinate system upon obtaining the i-th data and is given by expressions (7) to (9) with the aid of the state vector s and the data $D_i$.

$$t_{WC_i} = R_{WB} \cdot \begin{bmatrix} f_x^B & 0 & u_{xi}^{P1} \\ 0 & f_y^B & u_{yi}^{P1} \\ f_x^B & 0 & u_{xi}^{P2} \\ 0 & f_y^B & u_{yi}^{P2} \end{bmatrix}^+ \cdot \begin{bmatrix} -u_{xi}^{P1}(z_C'^{P1} - z_{WB}') - f_x^B(x_C'^{P1} - x_{WB}') \\ -u_{yi}^{P1}(z_C'^{P1} - z_{WB}') - f_y^B(y_C'^{P1} - y_{WB}') \\ -u_{xi}^{P2}(z_C'^{P2} - z_{WB}') - f_x^B(x_C'^{P2} - x_{WB}') \\ -u_{yi}^{P2}(z_C'^{P2} - z_{WB}') - f_y^B(y_C'^{P2} - y_{WB}') \end{bmatrix} \quad (7)$$

$$\begin{bmatrix} x_C'^{Pj} \\ y_C'^{Pj} \\ z_C'^{Pj} \end{bmatrix} = R_{WB}^{-1} \cdot R_{WC_i} \cdot x_C^{Pj} \quad (8)$$

$$\begin{bmatrix} x_{WB}' \\ y_{WB}' \\ z_{WB}' \end{bmatrix} = R_{WB}^{-1} \cdot t_{WB} \quad (9)$$

In the above expressions, $R_{WB}$ and $t_{WB}$ are respectively a rotation matrix standing for the orientation of the objective-viewpoint camera 140 and a translation vector standing for the position of the objective-viewpoint camera 140 both in the world coordinate system, and it is presumed that these are previously computed on the basis of the position and the orientation previously stored as known values, of the objective-viewpoint camera 140 in the world coordinate system. Also, $f^B_x$ and $f^B_y$ are focal distances of the objective-viewpoint camera 140 respectively in the x- and y-axis directions, and it is presumed that these are previously stored as known values.

The relationship among expressions (7) to (9) can be obtained by solving expressions (12) and (13) obtained by formulating a geometrical transformation upon observing the objective viewpoint indices $P_j$ (j=1, 2) with the objective viewpoint camera into expressions (10) and (11); and expanding these expressions.

$$x_{B_i}^{P_j} = \begin{bmatrix} x_{B_i}^{P_j} & y_{B_i}^{P_j} & z_{B_i}^{P_j} \end{bmatrix}^T = R_{WB}^{-1} \cdot (R_{WC_i} \cdot x_C^{P_j} + t_{WC_i} - t_{WB}) \quad (10)$$

$$u_i^{P_j} = \begin{bmatrix} u_{x_i}^{P_j} & u_{y_i}^{P_j} \end{bmatrix}^T = \begin{bmatrix} -f_x^B \frac{x_{B_i}^{P_j}}{z_{B_i}^{P_j}} & -f_y^B \frac{y_{B_i}^{P_j}}{z_{B_i}^{P_j}} \end{bmatrix} \quad (11)$$

$$u_{x_i}^{P_j} = -f_x^B \frac{x_C^{\prime P_j} + x_{WC_i}^\prime - x_{WB}^\prime}{z_C^{\prime P_j} + z_{WC_i}^\prime - z_{WB}^\prime} \quad (12)$$

$$u_{y_i}^{P_j} = -f_y^B \frac{y_C^{\prime P_j} + y_{WC_i}^\prime - y_{WB}^\prime}{z_C^{\prime P_j} + z_{WC_i}^\prime - z_{WB}^\prime} \quad (13)$$

Symbols $x'_{ci}$, $y'_{wci}$, and $z'_{wci}$ in expressions (12) and (13) have the relationship shown by expression below:

$$\begin{bmatrix} x'_{WC_i} \\ y'_{WC_i} \\ z'_{WC_i} \end{bmatrix} = R_{WB}^{-1} \cdot t_{WC_i} \quad (14)$$

In step S2090, with respect to the corresponding i from 1 through I, the computing section 180 computes an error $\Delta u_i^{Qki}$ between actual image coordinates $u_i^{Qki}$ of the subjective viewpoint index $Q_{ki}$ included in each data in the data list L and theoretical values $u'_i{}^{Qki}$ of the corresponding image coordinates by expression below:

$$\Delta u_i^{Qki} = u_i^{Qki} - u'_i{}^{Qki} \quad (15)$$

In step S2100, with respect to the corresponding i from 1 through I, the computing section 180 computes an image Jacobian $J_{uis}^{Qki}$ ($=\partial u_i^{Qki}/\partial s$) including the state vector s as a parameter, i.e., a Jacobian matrix of two rows and nine columns, having solutions as its respective elements obtained by partially differentiating the function $F_i(s)$ given by expression (1) with the respective elements of the state vector s. To be more specific, the computing section 180 computes a Jacobian matrix $J_{uixCi}^{Qki}$ ($=\partial u_i^{Qki}/\partial x_{Ci}^{Qki}$) of two rows and three columns, having solutions as its elements obtained by partially differentiating the right side of expression (3) with the respective elements of the position vector $x_{Ci}^{Qki}$ in the subjective-viewpoint-camera coordinate system and a Jacobian matrix $J_{xCis}^{Qki}$ ($=\partial x_{Ci}^{Qki}/\partial s$) of three rows and nine columns, having solutions as its elements obtained by partially differentiating the right side of expression (2) with the respective elements of the state vector s, and the image Jacobian $J_{uis}^{Qki}$ with the aid of expression below:

$$J_{uis}^{Qki} = J_{uixCi}^{Qki} \cdot J_{xCis}^{Qki} \quad (16)$$

In step S2110, the computing section 180 computes a compensation value $\Delta s$ of the vector s, on the basis of the error $\Delta u_i^{Qki}$ and the Jacobian matrix $J_{uis}^{Qki}$ computed through the above-described steps with respect to the corresponding i from 1 through I. To be more specific, the computing section 180 prepares a 2I-dimension error vector configured by vertically aligning the error $\Delta u_i^{Qki}$ for each subjective viewpoint index $Q_{ki}$; and a matrix of 2I-rows and nine columns configured by vertically aligning the Jacobian $J_{uis}^{Qki}$ for each subjective viewpoint index $Q_{ki}$, given by expressions (17) and (18), respectively. Then the computing section 180 computes the compensation value $\Delta s$ with the aid of expression (19) by using the pseudo inverse matrix $\phi^+$ of the matrix $\phi$ given by expression (18).

$$U = \begin{bmatrix} \Delta u_1^{Qk1} \\ \Delta u_2^{Qk2} \\ \vdots \\ \Delta u_I^{Qk1} \end{bmatrix} \quad (17)$$

$$\Phi = \begin{bmatrix} J_{u_1s}^{Qk1} \\ J_{u_2s}^{Qk2} \\ \vdots \\ J_{u_Is}^{Qk1} \end{bmatrix} \quad (18)$$

$$\Delta s^{Pk} = \varphi^+ U \quad (19)$$

While being obtained, for example, by an equation: $\phi^+ = (\phi^T \phi)^{-1} \phi^T$, the pseudo inverse matrix $\phi^+$ may be obtained differently.

In step S2120, the computing section 180 compensates for the vector s on the basis of the compensation value $\Delta s$ computed in step S2110 and sets the obtained value as a new vector s in accordance with expression below:

$$s = s + \Delta s \quad (20)$$

In step S2130, the computing section 180 determines whether calculation of these values converges by using a certain determination criterion such as the magnitude of the error vector U in expressions (19) whether being smaller than a predetermined threshold or the magnitude of the compensation value $\Delta s$ whether being smaller than a predetermined threshold. If the determination is non-convergence of the calculation, the computing section 180 performs the steps from step S2080 again on the basis of the compensated state vector s.

If the determination is convergence of the calculation, the computing section 180 outputs the obtained state vector s in step S2140.

Finally, the computing section 180 determines in step S2150 whether the calibration process is to be finished. When the operator instructs the calibration apparatus 100 to finish the calibration process, the process ends. When the operator instructs the calibration apparatus to continue the calibration process (to perform recalibration), the process returns to step S2005 and the calibration apparatus waits for an input of a data-obtaining command.

With the above-described process, two kinds of arrangement information of the indices and the sensor both displaced on and relative to the imaging device can be calibrated easily and accurately.

Modification of the First Embodiment

While a compensating value of the state vector is computed by the Newton-Raphson method given by expression (19) in the present embodiment, the method for computing the compensation value is not always limited to the Newton-Raphson. For example, the compensation value may be computed by the Levenberg-Marquard method (LM method) serving as the known method of iterative solution of a non-linear equation or by a combined method of the LM method with a statistical method such as an M-estimation serving as the known robust estimation method. One skilled in the art will appreciate that application of any numerical calculation method does not deteriorate the spirit of the present invention.

Also, while the orientation sensor is placed on the imaging device in the present embodiment, another sensor such as a position-orientation sensor may be used.

In addition, while the indices, each having the two dimensional coordinates on an image, are used as the subjective viewpoint indices in the present embodiment, a line feature or a geometric feature respectively disclosed in Lowe and Comport et al. may be used as a reference index for evaluation. For example, in the case of using the line feature, by defining a distance of the line from its origin as an error evaluation reference; configuring the error vector U of an error $\Delta d$ computed from a detection value d from the image and an evaluation value d' from the state vector s; and configuring the matrix $\phi$ of the Jacobian matrix $J_{ds}$ ($=\partial d/\partial s$) of a single row and nine columns having solutions as its elements obtained by partially differentiating the computing expression of d' with the respective elements of the state vector s, a compensation value can be computed with the same framework as described above. Since the computing expression of d' is disclosed in Lowe and Comport et al. as a function of the position and the orientation of the imaging device, and also the position and the orientation of the imaging device are obtained as a function of the vector s (by expressions (4) and (7)), the compensation value is easily obtained. Also, by accumulating errors and image Jacobians obtained from the line features, point features, and other indices, these features can be used at the same time.

Second Embodiment

In a calibration apparatus according to a second embodiment, a plurality of indices and a six-degree-of-freedom position-orientation sensor both placed on a measuring object are calibrated by capturing the indices placed on the measuring object with a movable camera having another six-degree-of-freedom position-orientation sensor placed thereon. While the positions of indices and the orientation of the orientation sensor both placed on and relative to the camera are treated as known parameters in the first embodiment, the respective positions & orientations of the respective indices and the six-degree-of-freedom position-orientation sensor both relative to the object are treated as unknown parameters in the second embodiment. The calibration apparatus and a calibration method according to the second embodiment will be described below.

Figure 3:
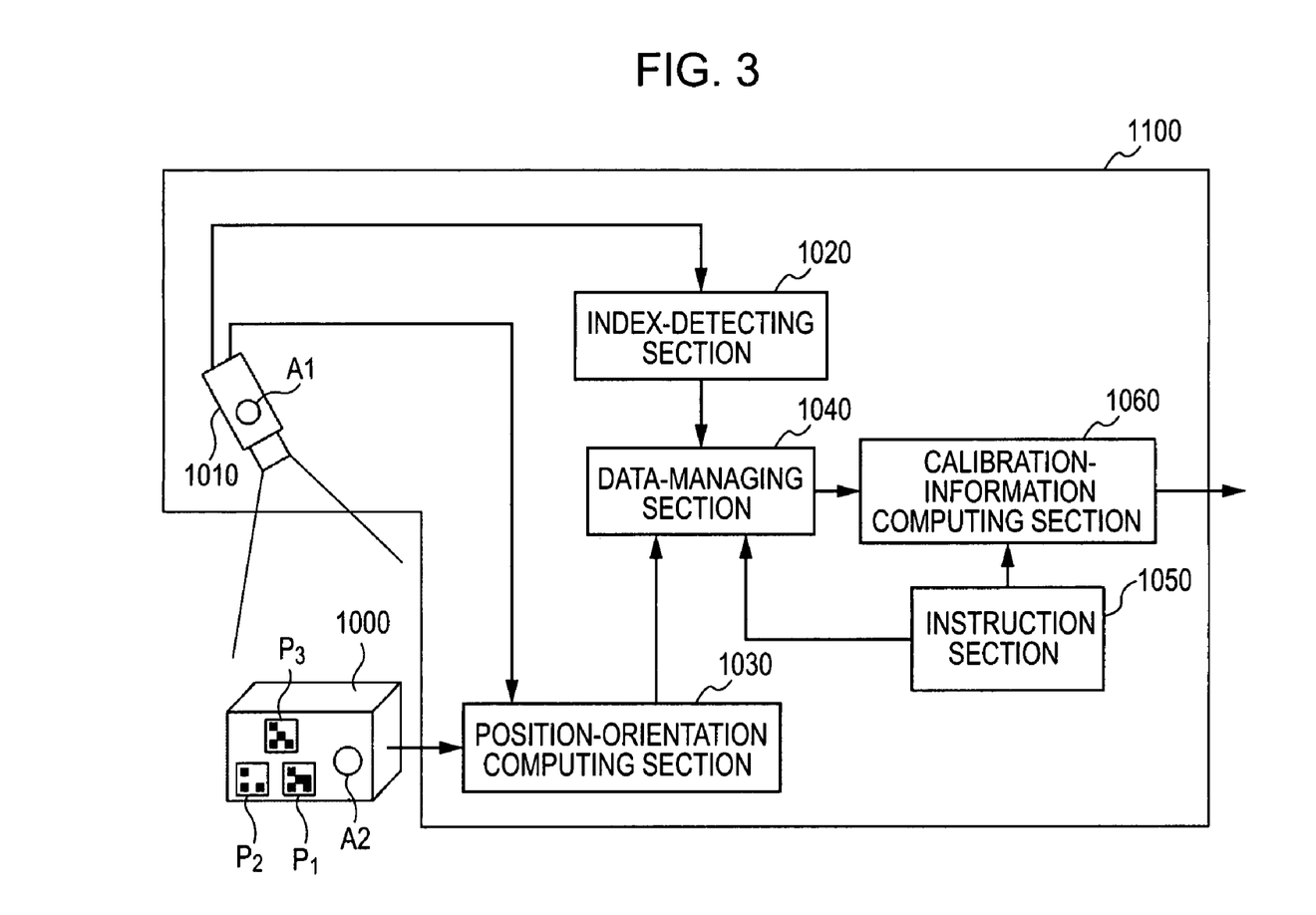
FIG. 3 shows an exemplary structure of a calibration apparatus according to a second embodiment of the present invention.

FIG. 3 shows the general structure of a calibration apparatus 1100 according to the present embodiment. As shown in FIG. 3, the calibration apparatus 1100 according to the present embodiment includes an imaging section (hereinafter, sometimes referred to as a camera) 1010, an index-detecting section 1020, a position-orientation computing section 1030, a data-managing section 1040, an instruction section 1050, and a calibration-information computing section 1060 and is connected to an object 1000 having indices placed thereon.

The object 1000 has a six-degree-of-freedom position-orientation sensor A2 placed thereon as a target of the calibration. With this, the position & orientation of the six-degree-of-freedom position-orientation sensor A2 can be measured with respect to the world coordinate system. The six-degree-of-freedom position-orientation sensor A2 is connected to the position-orientation computing section 1030. The imaging section 1010 has a six-degree-of-freedom position-orientation sensor A1 placed thereon. Meanwhile, it is presumed that the position & orientation of the six-degree-of-freedom position-orientation sensor A1 relative to the imaging section 1010 are known, and this allows the position & orientation of the imaging section 1010 with respect to the world coordinate system to be measured. The six-degree-of-freedom position-orientation sensor A1 is connected to the position-orientation computing section 1030.

Figures 5A, 5B:
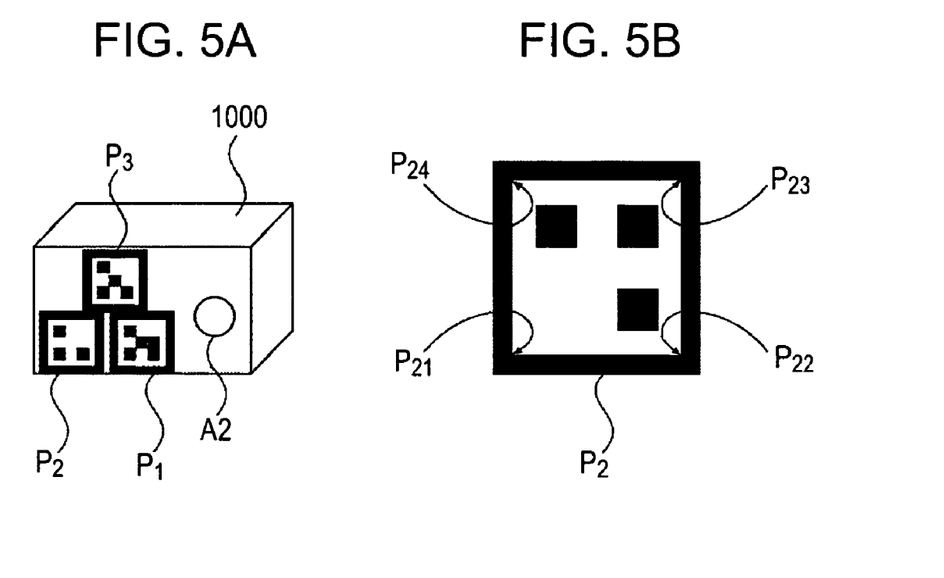
FIG. 5 shows an exemplary structure of indices according to the second embodiment.

The object 1000 has a plurality of indices placed thereon as shown in FIG. 5A as a target of the calibration. The indices placed on the object are written by $P_k$ (k=1 ... $K_o$), wherein $K_o$ stands for the number of the calibrating indices placed on the object. Each index $P_k$ is configured by points $P_{ki}$ (i=1 ... $N_k$) as shown in FIG. 5B, wherein $N_k$ stands for the total number of points constituting the index $P_k$. For example, in case of using quadrangular indices, an index consists of four vertices of the square and $N_k$=4. Here, it is presumed that the positions of the points constituting the corresponding index in the index-coordinate system are known. The position & orientation of each index in the object-coordinate system (the coordinate system in which one point on the object is defined as an origin and three axes orthogonal to one another are respectively defined as the x-, y-, and z-axes) are unknown. The position & orientation of the six-degree-of-freedom position-orientation sensor placed on the object in the object-coordinate system are also unknown. It is presumed that the object has reference indices $P_k$ (k=$K_o$+1 ... $K_o$+$K_1$) with at least three points displaced thereon, to define the object-coordinate system. Here, $K_1$ stands for the number of the reference indices. Thus, the total number of the indices placed on the object is $K_o$+$K_1$. The position & orientation of the reference indices in the object-coordinate system are known. All reference indices must be observed by the imaging section 1010 at least once in the same image together with another calibrating index. The indices $P_k$ placed on the object may be of any type as long as the image coordinates of a projection figure on a captured image can be detected, and each index and each of points constituting the index can be identified.

The imaging section 1010 captures the indices placed on the object 1000 from a variety of positions and directions. The captured image is input into the index-detecting section 1020.

The index-detecting section 1020 receives the image from the imaging section 1010 and detects the image coordinates of the respective points constituting the index $P_k$ (hereinafter, sometimes simply referred to as the image coordinates of the index) captured in the received image.

Also, the index-detecting section 1020 outputs the image coordinates $u^{p_{kni}}$ of each of points $p^{kni}$ constituting the detected index $p^{kn}$ and the corresponding identifier $k_n$ to the data-managing section 1040, wherein n (=1 ... M) stands for an index of the corresponding one of the detected indices and M stands for the total number of the detected indices. For example, when the quadrangular indices are used as reference indices, the image coordinates of the four vertices are detected and output as the image coordinates of each index. For example, FIG. 3 shows the case where quadrangular indices having identifiers 1, 2, and 3 are placed on the object. Here, $P_1$ and $P_2$ are calibrating indices, $P_3$ is reference index, $K_o$=2, and $K_1$=1. At a certain camera position, three indices are to be captured, and M=3. With this arrangement, the identifiers $k_1$=1, $k_2$=2, and $k_3$=3, and the corresponding image coordinates $u^{pk1i}$, $u^{pk2i}$ and $u^{pk3i}$ (i=1, 2, 3, 4) are output.

The position-orientation computing section 1030 will be described. Presuming that t stand for the position written by a ternary vector and R stand for the orientation written by a 3×3 rotation matrix, of a certain coordinate system A relative to another coordinate system B, coordinate transformation from a point $x_A$ in the coordinate system A to a point $x_B$ in the coordinate system B is written by expression (22) with the aid of a 4×4 matrix $M_{BA}$ given by expression (21).

$$M_{BA} = \begin{bmatrix} R & t \\ 0 & 1 \end{bmatrix} \quad (21)$$

$$\begin{bmatrix} x_B \\ 1 \end{bmatrix} = M_{BA} \begin{bmatrix} x_A \\ 1 \end{bmatrix} \quad (22)$$

In the present embodiment, the matrix $M_{BA}$ serves so as to express the position & orientation of the coordinate system A relative to the coordinate system B.

On the basis of the position & orientation $M_{WC}$ of the camera 1010 in the world coordinate system, obtained from a sensor measurement value of the six-degree-of-freedom position-orientation sensor A1 (hereinafter, sometimes referred to as the first six-degree-of-freedom position-orientation sensor) and the position & orientation $M_{WA2}$ of the six-degree-of-freedom position-orientation sensor A2 (hereinafter, sometimes referred to as the second six-degree-of-freedom position-orientation sensor) in the world coordinate system, obtained from a measurement value of the six-degree-of-freedom position-orientation sensor A2, the position-orientation computing section 1030 computes the position & orientation $M_{A2C}$ of the camera 1010 in the coordinate system of the second six-degree-of-freedom position-orientation sensor with expression below:

$$M_{A2C} = M_{WA2}^{-1} \cdot M_{WC} \quad (23)$$

Also, in the present embodiment, a position and an orientation are internally written by ternary vectors $x = [x\ y\ z]^T$ and $\omega = [\xi\ \psi\ \zeta]^T$, respectively. While a variety of methods for expressing an orientation by a ternary value are proposed, it is presumed here that the orientation is written by a ternary vector defining its rotating angle and rotating direction with the magnitude and orientation of the vector, respectively. The position x and the orientation $\omega$ can be combined into a six dimensional vector: $a = [x\ y\ z\ \xi\ \psi\ \zeta]^T$.

The 4×4 matrix $M_{A2C}$ obtained from the sensor output values, expressing the position & orientation of the camera 1010 in the coordinate system of the second six-degree-of-freedom position-orientation sensor can be transformed into a six dimensional vector: $a_{A2C} = [x_{A2C}\ y_{A2C}\ z_{A2C}\ \xi_{A2C}\ \psi_{A2C}\ \zeta_{A2C}]^T$.

The position-orientation computing section 1030 outputs the position & orientation of the camera 1010 in the coordinate system of the second six-degree-of-freedom position-orientation sensor to the data-managing section 1040 in response to its request.

The instruction section 1050 transmits an instruction of obtaining data to the data-managing section 1040 upon receipt of a data-obtaining command from an operator (not shown). The instruction section 1050 also transmits another instruction of computing calibration information to the calibration-information computing section 1060 upon receipt of a calibration-information computing command from the operator.

Upon receipt of the instruction of obtaining data from the instruction section 1050, the data-managing section 1040 receives (i) the position & orientation of the camera 1010 in the coordinate system of the second six-degree-of-freedom position-orientation sensor from the position-orientation computing section 1030, (ii) the image coordinates of indices, and (iii) the corresponding identifiers of the indices from the index-detecting section 1020. Then, the data-managing section 1040 creates a plurality of data sets and adds them to a data list for storage. Here, each data set is configured by (a) the position & orientation of the camera 1010 in the coordinate system of the second six-degree-of-freedom position-orientation sensor at a certain time, (b) the image coordinates of an index detected at the same time, and (c) the identifier of the detected index. Also, the data-managing section 1040 outputs the created data list to the calibration-information computing section 1060 in response to its request.

Upon receipt of the instruction of computing calibration information from the instruction section 1050, the calibration-information computing section 1060 receives the data list from the data-managing section 1040, performs a calibration process on the basis of the data list, and outputs the calibration information (i.e., the position & orientations of each index and the second six-degree-of-freedom position-orientation sensor, both in the object coordinate system) obtained as a result of the calibration process.

Figure 4:
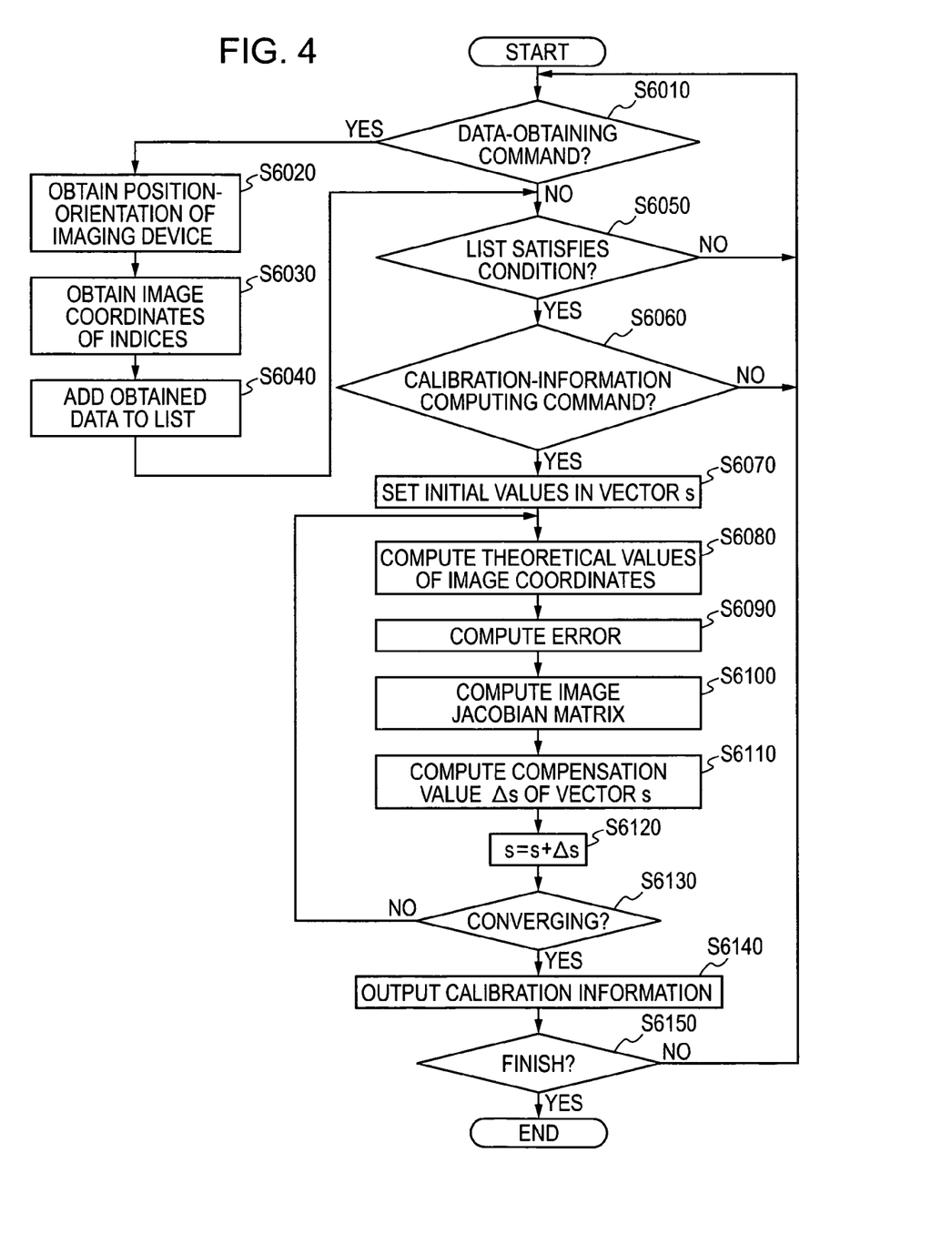
FIG. 4 is a flowchart of an exemplary process of a calibration method according to the second embodiment.

FIG. 4 is a flowchart of the process of the calibration apparatus according to the present embodiment, for obtaining calibration information. Program code in accordance with the flowchart is stored in memories (not shown) such as a RAM and/or a ROM in the calibration apparatus and read and executed by a CPU (not shown).

In step S6010, the instruction section 1050 determines whether a data-obtaining command is input by the operator. The operator inputs the data-obtaining command upon arranging the object 1000 or the camera 1010 at a position for obtaining calibrating data. If it is determined in step 6010 that a data-obtaining command is not input by the operator, processing proceeds to step S6050. Otherwise, if receiving the data-obtaining command, the instruction section 1050 allows the process to move to step S6020.

In step S6020, from the position-orientation computing section 1030, the data-managing section 1040 receives the position & orientation of the camera 1010: $a_{A2C} = [x_{A2C}\ y_{A2C}\ z_{A2C}\ \xi_{A2C}\ \psi_{A2C}\ \zeta_{2C}]^T$, in the coordinate system of the second six-degree-of-freedom position-orientation sensor.

In step S6030, from the index-detecting section 1020, the data-managing section 1040 receives an identifier $k_n$ and image coordinates $u^{Pkni}$ of each index $P_{kn}$ detected by the index-detecting section 1020. The index-detecting section 1020 detects indices in an inputted image. Hence, with this step, the position & orientation of the camera 1010 in the coordinate system of the second six-degree-of-freedom position-orientation sensor and the image coordinates and the identifier of the indices at the same time can be obtained. Meanwhile, information input from the index-detecting section 1020 is not needed to always cover all indices on the object and is sufficient as long as it covers indices detected in the image.

In step S6040, the data-managing section 1040 adds received sets of data about all detected indices $P_{kn}$ to a data list DL as data $D_j$. To be more specific, when the position & orientation $a_{A2C}$ of the camera 1010 received from the position-orientation computing section 1030 is written by $a_{A2Cj} = [x_{A2Cj}\ y_{A2Cj}\ z_{A2Cj}\ \xi_{A2Cj}\ \psi_{A2Cj}\ \zeta_{A2Cj}]^T$, the identifier $k_n$ received from the index-detecting section 1020 is written by $k_j$, and the set of image coordinates $u^{Pkni}$ received from the same is written by $u^{Pkji}$, a set of $D_j = [a_{A2Cj}\ u^{Pkji}\ k_j]$ is registered in the data list DL as the j-th data, wherein j ($= 1 \ldots N_j$) stands for an index of the corresponding set of data registered in the data list DL, and $N_j$ stands for the total number of sets of the registered data. With the above-described step, data is obtained.

In step S6050, the data-managing section 1040 determines whether the already obtained data list has sufficient information for computing calibration information. If the data list does not satisfy the condition, the process returns to step S6010 and the calibration apparatus waits for an input of a data-obtaining command. If the data list satisfies the condition for computing calibration information, the process moves to step S6060. An example condition of the data list of having information sufficient for computing calibration information is set such that data about all indices appears twice or more in the data list DL. Meanwhile, since accuracy of the computed calibration information improves as the versatility of input data increases, the condition may be set so as to request a greater number of data.

In step S6060, it is determined whether a calibration-information computing command is input by the operator. If the calibration-information computing command is input by the operator, the process moves to step S6070, and if not, the process returns to step S6010 and the calibration apparatus waits for an input of a data-obtaining command.

The calibration-information computing section 1060 (hereinafter, sometimes shortly referred to as the computing section 1060) treats calibration information to be obtained, in other words, the positions & orientations of the respective calibrating indices and the second six-degree-of-freedom position-orientation sensor both in the object coordinate system, as unknown parameters. In the following descriptions, the positions & orientations of the respective calibrating indices and the second six-degree-of-freedom position-orientation sensor both in the object coordinate system are respectively written by state vectors $s_{mk}=[x_{mk}\ y_{mk}\ z_{mk}\ \xi_{mk}\ \psi_{mk}\ \zeta_{mk}]^T$ ($k=1\ldots K_o$) and $s_{OA2}=[x_{OA2}\ y_{OA2}\ z_{OA2}\ \xi_{OA2}\ \psi_{OA2}\ \zeta_{OA2}]^T$.

In step S6070, the computing-section 1060 provides appropriate initial values to the respective state vectors $s_{mk}$ ($k=1\ldots K_o$) and $s_{OA2}$. As the respective initial values, the operator may manually input approximate values with the aid of the instruction section 1050. When three transformation matrices expressing the respective positions & orientations of the camera 1010 in the coordinate system of the second six-degree-of-freedom position-orientation sensor, the second six-degree-of-freedom position-orientation sensor in the object coordinate system, and the index in the object coordinate system are respectively written as $M_{A2C}$, $M_{OA2}$, and $M_{OM}$, a transformation matrix $M_{CM}$ from the index-coordinate system to the camera-coordinate system can be obtained from these matrices as given by the following expression:

$$M_{CM}=M_{A2C}^{-1}\cdot M_{OA2}^{-1}\cdot M_{OM} \qquad (24)$$

In step S6080, the computing-section 1060 computes a calculation value $u^{pkji'}=[u_x^{pkji'}\ u_y^{pkji'}]$ of the image coordinates of an index $P_{kj}$ on the basis of the corresponding data $D_j=[a_{A2Cj}\ u^{pkji}\ k_j]$ ($j=1, 2 \ldots N_j$) in the data list DL and the state vectors $s_{mkj}$ and $S_{OA2}$ with respect to the corresponding j from 1 through $N_j$ and i from 1 through $N_k$. Meanwhile, the calculation value of the image coordinates of the index $P_{kj}$ indicates the position (the coordinates) of point $p_{kji}$ of the index $P_{kj}$ to be observed in the received image for certain state vectors $s_{mkj}$ and $S_{OA2}$. The value $u^{pkji'}$ is computed on the basis of a function of a state vector: $s=[s_{m1}^T\ s_{m2}^T\ldots s_{mKo}^T\ s_{OA2}^T]^T$, providing the position & orientation of the respective calibrating indices and the second six-degree-of-freedom position-orientation sensor in the object-coordinate system, as written by the following expression:

$$u^{pkji'}=F_j(s) \qquad (25)$$

To be more specific, when the j-th data is obtained and the data is about a calibrating index, the function $F_j(s)$ is configured by expressions (26) for obtaining a position vector $x_C^{pkji}$ of the i-th point of the index $P_{kj}$ in the camera coordinates from $s_{mkj}$ and $s_{OA2}$; and expression (27) for obtaining the coordinates $u^{pkji'}$ of the i-th point of the index $P_{kj}$ in the image from $x_C^{pkji}$.

$$x_C^{p_{kj}i}=\left[x_C^{p_{kj}i}\ y_C^{p_{kj}i}\ z_C^{p_{kj}i}\ 1\right]^T=M_{A2C}^{-1}\cdot M_{OA2}^{-1}(s_{OA2})\cdot M_{OM}(s_{mkj})\cdot x_M^{p_{kj}i} \qquad (26)$$

$$u^{p_{kj}i'}=\left[u_x^{p_{kj}i'}\ u_y^{p_{kj}i'}\right]^T=\left[-f_x^B\frac{x_C^{p_{kj}i}}{z_C^{p_{kj}i}}\ -f_y^B\frac{y_C^{p_{kj}i}}{z_C^{p_{kj}i}}\right]^T \qquad (27)$$

In the above expressions, $x_M^{pkji}$ is the position of the i-th point of the index $P_{kj}$ in the index-coordinate system; $f_x^B$ and $f_y^B$ are the focal distances of the camera 1010 respectively in the X- and Y-axes directions, and it is presumed that these are previously stored as known values. Also, $M_{A2C}$ is a transformation matrix decided by $a_{A2Cj}$, $M_{OM}(s_{mkj})$ is a transformation matrix (i.e., a matrix for transformation from the $k_j$-th index-coordinate system to the object-coordinate system) decided by $s_{mkj}$, and $M_{OA2}(s_{OA2})$ is a transformation matrix decided by $s_{OA2}$.

The transformation matrix $M_{OM}(s_{mk})$ ($k=1\ldots K_o$) is defined by the following expressions:

$$M_{OM}(s_{mk})=\begin{bmatrix}\frac{\xi_{mk}^2}{\theta^2}(1-\cos\theta)+\cos\theta & \frac{\xi_{mk}\psi_{mk}}{\theta^2}(1-\cos\theta)-\frac{\zeta_{mk}}{\theta}\sin\theta & \frac{\xi_{mk}\zeta_{mk}}{\theta^2}(1-\cos\theta)+\frac{\psi_{mk}}{\theta}\sin\theta & x_{mk}\\ \frac{\psi_{mk}\xi_{mk}}{\theta^2}(1-\cos\theta)+\frac{\zeta_{mk}}{\theta}\sin\theta & \frac{\psi_{mk}^2}{\theta^2}(1-\cos\theta)+\cos\theta & \frac{\psi_{mk}\zeta_{mk}}{\theta^2}(1-\cos\theta)-\frac{\xi_{mk}}{\theta}\sin\theta & y_{mk}\\ \frac{\zeta_{mk}\xi_{mk}}{\theta^2}(1-\cos\theta)-\frac{\psi_{mk}}{\theta}\sin\theta & \frac{\zeta_{mk}\psi_{mk}}{\theta^2}(1-\cos\theta)+\frac{\xi_{mk}}{\theta}\sin\theta & \frac{\zeta_{mk}^2}{\theta^2}(1-\cos\theta)+\cos\theta & z_{mk}\\ 0 & 0 & 0 & 1\end{bmatrix} \qquad (28)$$

$$\theta=\sqrt{\xi_{mk}^2+\psi_{mk}^2+\zeta_{mk}^2} \qquad (29)$$

The transformation matrix $M_{OA2}(s_{OA2})$ is defined by the following expressions:

$$M_{OA2}(s_{OA2}) = \begin{bmatrix} \frac{\xi_{OA2}^2}{\theta^2}(1-\cos\theta)+\cos\theta & \frac{\xi_{OA2}\psi_{OA2}}{\theta^2}(1-\cos\theta)-\frac{\zeta_{OA2}}{\theta}\sin\theta & \frac{\xi_{OA2}\zeta_{OA2}}{\theta^2}(1-\cos\theta)+\frac{\psi_{OA2}}{\theta}\sin\theta & x_{OA2} \\ \frac{\psi_{OA2}\xi_{OA2}}{\theta^2}(1-\cos\theta)+\frac{\zeta_{OA2}}{\theta}\sin\theta & \frac{\psi_{OA2}^2}{\theta^2}(1-\cos\theta)+\cos\theta & \frac{\psi_{OA2}\zeta_{OA2}}{\theta^2}(1-\cos\theta)-\frac{\xi_{OA2}}{\theta}\sin\theta & y_{OA2} \\ \frac{\zeta_{OA2}\xi_{OA2}}{\theta^2}(1-\cos\theta)-\frac{\psi_{OA2}}{\theta}\sin\theta & \frac{\zeta_{OA2}\psi_{OA2}}{\theta^2}(1-\cos\theta)+\frac{\xi_{OA2}}{\theta}\sin\theta & \frac{\zeta_{OA2}^2}{\theta^2}(1-\cos\theta)+\cos\theta & z_{OA2} \\ 0 & 0 & 0 & 1 \end{bmatrix} \quad (30)$$

$$\theta = \sqrt{\xi_{OA2}^2 + \psi_{OA2}^2 + \zeta_{OA2}^2} \quad (31)$$

On the other hand, when the j-th data is about a reference index, function $F_j(s)$ is configured by modifying expressions (26) to $$x_C^{Pkj} = [x_C^{Pkj} \, y_C^{Pkj} \, z_C^{Pkj} \, 1]^T = M_{A2C}^{-1} \cdot M_{OA2}^{-1}(s_{OA2})$$
$$\cdot M_{OM_{kj}} \cdot x_M^{Pkj} \quad (26A)$$

Here, $M_{OMkj}$ is a transformation matrix (i.e., a matrix for transformation from the $k_j$-th index-coordinate system to the object-coordinate system) deduced from known position & orientation of the reference index in the object coordinate system.

In step S6090, with respect to the corresponding j from 1 through $N_j$ and i from 1 through $N_k$, the computing-section 1060 computes an error $\Delta u^{pkji}$ between the actual image coordinates $u^{pkji}$ of the index $P_{knj}$ included in each data in the data list DL and the calculation value $u^{pkji'}$ of the corresponding image coordinates with the following expression:

$$\Delta u^{Pkji} = u^{Pkji} - u^{Pkji'} \quad (32)$$

In step S6100, with respect to the corresponding j from 1 through $N_j$ and i from 1 through $N_k$, the computing section 1060 computes an image Jacobian $J_{us}^{pkji}$ ($=\partial u^{pkji}/\partial s$) including a state vector: $s=[s_{m1}^T s_{m2}^T \ldots s_{mKo}^T s_{OA2}^T]^T$, as a parameter, i.e., a Jacobian matrix of 2 rows and $(6K_o+6)$ columns, having solutions as its respective elements obtained by partially differentiating the function $F_j(s)$ given by expression (35), which will be described later, with the respective elements of each of the state vectors $s_{mk}$ and $s_{OA2}$.

In step S6110, the computing-section 1060 computes a compensation value $\Delta s$ of the vector s on the basis of the error $\Delta u^{pkji}$ and the Jacobian $J_{us}^{pkji}$ computed with the above-described steps with respect to the corresponding j from 1 through $N_j$ and i from 1 through $N_k$. To be more specific, the computing section 1060 prepares a $(2 \times N_j \times N_k)$-dimension error vector U configured by vertically aligning $\Delta u^{pkji}$ and a matrix $\phi$ of $(2 \times N_j \times N_k)$ rows and $(6K_o+6)$ columns configured by vertically aligning the Jacobian $J_{us}^{pkji}$, respectively, given by expressions (33) and (34), and computes the compensation value $\Delta s$ with the aid of expression (35) on the basis of the pseudo inverse matrix $\phi^+$ of the matrix $\phi$ given by expression (34).

$$U = \begin{bmatrix} \Delta u^{Pk_1 1} \\ \Delta u^{Pk_1 2} \\ \vdots \\ \Delta u^{Pk_j i} \\ \vdots \\ \Delta u^{Pk_{N_j} N_k} \end{bmatrix} \quad (33)$$

$$\Phi = \begin{bmatrix} J_{us}^{Pk_1 1} \\ J_{us}^{Pk_1 2} \\ \vdots \\ J_{us}^{Pk_j i} \\ \vdots \\ J_{us}^{Pk_{N_j} N_k} \end{bmatrix} \quad (34)$$

$$\Delta s = \varphi^+ U \quad (35)$$

Because of being given by a vector of $(6K_o+6)$ dimensions, the compensation value $\Delta s$ can be obtained if $(2 \times N_j \times N_k)$ is equal to $(6K_o+6)$ or greater. Although $\phi^+$ can be computed by, for example, an equation: $\phi^+ = (\phi^T \phi)^{-1} \phi^T$, it may be obtained differently.

In step S6120, the computing-section 1060 compensates for the vector s on the basis of the compensation value $\Delta s$ computed in step S6110 and sets the obtained value as a new vector s according to the following expression:

$$s = s + \Delta s \quad (36)$$

The state vector: $s = [s_{m1}^T s_{m2}^T \cdots s_{mKo}^T s_{OA2}^T]^T$ is configured by the state vectors $s_{mk}$ and $s_{OA2}$, respectively, of the positions & orientations of the respective calibrating indices and the second six-degree-of-freedom position-orientation sensor both in the object coordinate system.

In step S6130, the computing section 1060 determines whether calculation of these values converges with the aid of a certain determination criterion, for example, the magnitude of the error vector U whether being smaller than a predetermined threshold or the magnitude of the computed compensation value $\Delta s$ whether being smaller than a predetermined threshold. If the determination is non-convergence of the calculation, the computing section 1060 performs the steps from step S6080 again on the basis of the compensated state vector s.

If determination in step S6130 is convergence of calculation, in step S6140, the computing section 1060 outputs the positions & orientations $s_{mk}$ (k=1 ... $K_o$) and $s_{OA2}$ of the obtained state vector s, respectively, of the respective calibrating indices and the second six-degree-of-freedom position-orientation sensor both in the object coordinate system so as to serve as calibration information. On this occasion, the state vectors $s_{mk}$ (k=1 ... $K_o$) and $s_{OA2}$ may be output in any one of output forms: (a) $s_{mk}$ and $s_{OA2}$ without modification, (b) a ternary vector standing for the position components and an Euler angle or a 3×3 rotation matrix standing for the orientation components of $s_{mk}$ and $s_{OA2}$, and (c) 4×4 coordination-transformation matrices $M_{OM}$ and $M_{OA2}$ generated from $s_{mk}$ and $s_{OA2}$, respectively.

Finally, the computing section 1060 determines in step S6150 whether the calibration process is to be finished. When the operator instructs the calibration apparatus 1100 to finish the calibration process, the process ends. When the operator instructs the calibration apparatus to continue the calibration process (to perform recalibration), the process returns to step S6010 and the calibration apparatus waits for an input of a data-obtaining command.

With the above-described process, the positions or the respective positions & orientations of the respective indices and the second six-degree-of-freedom position-orientation sensor both placed and relative to the measuring object (i.e., in the measuring-object coordinate system) can be obtained.

Modification 1 of the Second Embodiment

While the positions & orientations of each of the plurality of indices and the second six-degree-of-freedom position-orientation sensor both in the object coordinate system and placed on the object serve as calibration information in the second embodiment, the position & orientation of the first six-degree-of-freedom position-orientation sensor placed on the camera 1010 in the camera coordinate may be additionally added to the calibration information.

While the position & orientation $M_{CA1}$ of the first six-degree-of-freedom position-orientation sensor placed on the camera in the camera coordinate system are regarded as known in the second embodiment, these are regarded here as unknown parameters. On the basis of the positions & orientations $M_{WA1}$ and $M_{WA2}$ of the six-degree-of-freedom position-orientation sensors A1 and A2 placed on the camera and the object, obtained from sensor-measurement values of the six-degree-of-freedom position-orientation sensors A1 and A2, respectively, the position & orientation $M_{A2A1}$ of the six-degree-of-freedom position-orientation sensor A1 placed on the camera 1010 in the coordinate system of the six-degree-of-freedom position-orientation sensor A2 is computed by the following expression:

$$M_{A2A1}=M_{WA2}^{-1} \cdot M_{WA1} \quad (37)$$

When $M_{CA1}$, $M_{A2A1}$, $M_{OA2}$, and $M_{OM}$, respectively, stand for a transformation matrix expressing the position & orientation of the first six-degree-of-freedom position-orientation sensor in the camera coordinate system; a transformation matrix expressing the position & orientation of the first six-degree-of-freedom position-orientation sensor A1 in the coordinate system of the second six-degree-of-freedom position-orientation sensor A2; a transformation matrix expressing the position & orientation of the second six-degree-of-freedom position-orientation sensor A2 in the object coordinate system; and a transformation matrix expressing the positions & orientations of the respective indices placed on the object in the object-coordinate system, a transformation matrix $M_{CM}$ from the index-coordinate system to the camera-coordinate system is given by the following expression:

$$M_{CM}=M_{CA1} \cdot M_{A2A1}^{-1} \cdot M_{OA2}^{-1} \cdot M_{OM} \quad (38)$$

In the same fashion as in the second embodiment, calibration information to be obtained, in other words, the positions & orientations $M_{OM}$, $M_{OA2}$, and $M_{CA1}$, respectively, of each of the respective indices in the object-coordinate system; the second six-degree-of-freedom position-orientation sensor in the object coordinate system; and the first six-degree-of-freedom position-orientation sensor in the camera coordinate system, are treated as senary vectors. Here, the position & orientation of the corresponding index in the object-coordinate system are written by the state vector: $s_{mk}=[x_{mk}\ y_{mk}\ z_{mk}\ \xi_{mk}\ \psi_{mk}\ \zeta_{mk}]^T$ (k=1 ... $K_o$), those of the second six-degree-of-freedom position-orientation sensor in the object coordinate system are written by the state vector: $s_{OA2}=[x_{OA2}\ y_{OA2}\ z_{OA2}\ \xi_{OA2}\ \psi_{OA2}\ \zeta_{OA2}]^T$, and those of the first six-degree-of-freedom position-orientation sensor in the camera coordinate system are written by a state vector: $s_{CA1}=[x_{CA1}\ y_{CA1}\ z_{CA1}\ \xi_{CA1}\ \psi_{CA1}\ \zeta_{CA1}]^T$.

Appropriate initial values are provided to the respective state vectors $s_{mk}$, $s_{OA2}$, and $s_{CA1}$. For example, the initial values are previously obtained by manual measurement. An unknown parameter serving as calibration information is expressed by $s=[s_{m1}^T\ s_{m2}^T\ ...\ s_{mKo}^T\ s_{OA2}^T\ s_{CA1}^T]^T$, and, for example, with the repetitive calculation by using an image Jacobian in the same fashion as in the second embodiment, an optimal solution of the vector s is computed with respect to all inputted data. With this, the positions & orientations of the respective indices in the object-coordinate system, and the positions & orientations of the first and second six-degree-of-freedom position-orientation sensors respectively in the object and camera coordinate systems are obtained and output as calibration information.

Modification 2 of the Second Embodiment

The calibration apparatus according to the second embodiment is intended to calibrate the respective positions & orientations of the respective indices and the six-degree-of-freedom sensor both placed on and relative to a measuring object (i.e., in the measuring-object coordinate system), and the positions of the respective points constituting each of the indices placed on the object are known in the index-coordinate system defined with respect to the corresponding index. In the meantime, the shape of the index is not limited to the above-described one, and it may have a point shape (hereinafter, an index having a point shape is referred to as a point index). In this case, the calibration apparatus computes the positions of point indices placed on and relative to an object and the position & orientation of the six-degree-of freedom sensor relative to the measuring object so as to serve as calibration information. The point indices may be configured by, for example, circular markers having respectively different colors or feature points such as natural features having respectively different texture features.

Figure 6:
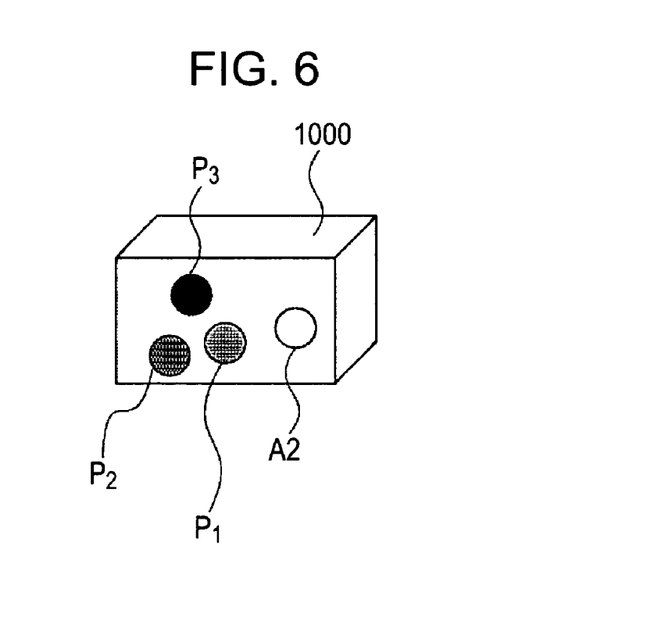
FIG. 6 shows an exemplary structure of indices according to a modification of the second embodiment.

Point indices placed on the object 1000 as shown in FIG. 6 are written by $P_k$ (k=1 ... $K_o$), where $K_o$ stands for the number of calibrating indices placed on the object. The point indices $P_k$ placed on the object may be of any type as long as the image coordinates of each projection figure on a captured image can be detected, and the point indices can be individually identified. The object has at least three indices $P_k$ ($k=K_o+1 \ldots K_o+K_1$) (not shown in FIG. 6) displaced thereon, serving as reference indices for defining the object-coordinate system, and their positions in the object-coordinate system are known and not aligned on a common straight line. When a vector expressing the positions of the point indices $P_k$ placed on the measuring-object in the object coordinate is written by $x_{OMk}$, a geometrical transformation upon observing the point indices $P_k$ placed on the object through the camera is given by the following expression:

$$x_C^{Pkj} = M_{A2C}^{-1} \cdot M_{OA2}^{-1}(s_{OA2}) \cdot x_{OMkj} \tag{39}$$

In the expression (39), $x_C^{Pkj}$ stands for the camera coordinates of the point index $P_k$, j (=1 ... $N_j$) stands for an index of the corresponding set of data registered in the data list DL, and $N_j$ stands for the total number of sets of registered data.

In the same fashion as in the second embodiment, calibration information to be obtained, i.e., the position $x_{OMk}$ of the corresponding one of the calibrating point indices in the object coordinate system is written by the state vector: $s_{OMk} = [x_{OMk} \ y_{OMk} \ z_{OMk}]^T$ ($k=1 \ldots K_o$), and the position & orientation $M_{OA2}$ of the second six-degree-of-freedom position-orientation sensor in the object coordinate system is written by the state vector: $s_{OA2} = [x_{OA2} \ y_{OA2} \ z_{OA2} \ \xi_{OA2} \ \psi_{OA2} \ \zeta_{OA2}]^T$. The position $x_{OMk}$ is known value if the point index is reference one.

Appropriate initial values are provided to the respective state vectors $s_{OMk}$ ($k=1 \ldots K_o$) and $s_{OA2}$. The initial values are previously obtained, for example, by manual measurement. An unknown parameter serving as calibration information is expressed by $s = [s_{OM1}^T \ s_{OM2}^T \ldots s_{OMKo}^T \ s_{OA2}^T]^T$, and, for example, with the repetitive calculation by using an image Jacobian in the same fashion as in the second embodiment, an optimal solution of the vector s is computed with respect to all inputted data. With this, the positions of the respective calibrating point indices and the position & orientation of the six-degree-of-freedom position-orientation sensor both in the object coordinate system can be output as calibration information.

Other Embodiments

One skilled in the art will appreciate that the present invention can be embodied such that a storage medium (or a recording medium) having the program code (software) stored therein, for achieving the functions of each of the foregoing embodiments, is supplied to a system or an apparatus, and a computer (or a CPU or a micro-processing unit (MPU)) of the system or the apparatus reads and executes the program code stored in the storage medium. Also, one skilled in the art will appreciate that, besides achievement of the functions of each of the embodiments by reading and executing the program code with the computer, the functions can be achieved such that an operating system (OS) or the like running on the computer performs a part of or all of the actual process according to instructions of the program code.

In addition, those skilled in the art will appreciate that the functions can be achieved such that the program code read from the storage medium is written in a functional extension card inserted in the computer or a memory included in a functional extension unit connected to the computer, and a CPU included in the functional extended card or the functional extended unit performs a part of or all of the actual process according to instructions of the program code.

When the present invention is applied to the storage medium, the storage medium stores the program code corresponding to the above-described flowchart shown FIG. 2 or 4.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2004-320638 filed Nov. 4, 2004 and Japanese Application No. 2005-217554 filed Jul. 27, 2005, which are hereby incorporated by reference herein in their entireties.

What is claimed is:

1. An information processing method for an information processing apparatus including a calibration-information computing section to calculate first arrangement information of first indices arranged on an object and second arrangement information of a sensor arranged on the object, the information processing method comprising steps of:

obtaining a first image of the object captured by a capture device;

receiving orientation information of the object, the orientation information being measured by the sensor arranged on the object;

detecting the first indices arranged on the object, from the first image and calculating, by the calibration-information computing section, the first arrangement information relative to the object and the second arrangement information relative to the object, from the received orientation information and first image coordinates of the detected first indices.

2. The information processing method according to claim 1, wherein the second arrangement information is information about orientation of the sensor relative to the object.

3. The information processing method according to claim 1, wherein the sensor is a six-degree-of-freedom position-orientation sensor and the second arrangement information is information about position and orientation of the six-degree-of-freedom position-orientation sensor relative to the object.

4. The information processing method according to claim 1, wherein the object includes an imaging section, the information processing method further comprising steps of:

obtaining a second image captured by the imaging section; and detecting second indices from the second image, wherein, in the calculating step, the first arrangement information relative to the object and the second arrangement information relative to the object are calculated from the received orientation information, the first image coordinates of the detected first indices, and second image coordinates of the detected second indices.

5. The information processing method according to claim 4, wherein the calculating step includes steps of:

setting values as the first arrangement information and the second arrangement information;

estimating image coordinates of the second indices of the second image from the received orientation information and the first image coordinates of the detected first indices, based on the set first arrangement information and the set second arrangement information; and updating values as the first arrangement information and the second arrangement information such that an error between the second image coordinates and the estimated image coordinates is reduced.

6. A computer-readable storage medium having stored thereon a program implementing an information processing method on an information processing apparatus including a calibration-information computing section to calculate first arrangement information of first indices arranged on an object and second arrangement information of a sensor arranged on the object, the information processing method performed by the program stored on the computer-readable storage medium comprising:

obtaining a first image of the object captured by a capture device;

receiving orientation information of the object, the orientation information being measured by the sensor arranged on the object;

detecting; the first indices arranged on the object, from the first image and calculating, by the calibration-information computing section, the first arrangement information relative to the object and the second arrangement information relative to the object, from the received orientation information and first image coordinates of the detected first indices.

7. An information processing apparatus for computing first arrangement information of first indices arranged on an object and second arrangement information of a sensor arranged on the object, the information processing apparatus comprising:

an imaging section configured to capture the object;

a measurement-value inputting section configured to input orientation information of the object, the orientation information being measured by the sensor arranged on the object;

an image-receiving section configured to receive an image captured by the imaging section;

a detecting section configured to detect the first indices arranged on the object, from the first image; and a calibration-information computing section configured to calculate the first arrangement information relative to the object and the second arrangement information relative to the object, from the received orientation information and first image coordinates of the detected first indices.

* * * * *